United States Patent
Luers

(10) Patent No.: US 8,386,655 B2
(45) Date of Patent: Feb. 26, 2013

(54) METHOD AND ARRANGEMENT FOR POSITION-DEPENDENT CONFIGURATION OF A MOBILE APPLIANCE

(75) Inventor: Jürgen Luers, Borchen (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 558 days.

(21) Appl. No.: 11/992,145

(22) PCT Filed: Aug. 30, 2006

(86) PCT No.: PCT/EP2006/065800
§ 371 (c)(1), (2), (4) Date: Mar. 17, 2008

(87) PCT Pub. No.: WO2007/033890
PCT Pub. Date: Mar. 29, 2007

(65) Prior Publication Data
US 2009/0024765 A1   Jan. 22, 2009

(30) Foreign Application Priority Data

Sep. 21, 2005  (DE) .......................... 10 2005 045 182

(51) Int. Cl.
*G06F 3/00* (2006.01)
*H04M 1/00* (2006.01)
(52) U.S. Cl. .............................. 710/9; 710/43; 455/456.1
(58) Field of Classification Search ................ 710/9, 43; 455/456.1
See application file for complete search history.

(56) References Cited

U.S. PATENT DOCUMENTS

| | | | |
|---|---|---|---|
| 6,515,988 B1* | 2/2003 | Eldridge et al. | 370/389 |
| 6,711,474 B1* | 3/2004 | Treyz et al. | 701/1 |
| 6,985,745 B2* | 1/2006 | Quaid | 455/456.2 |
| 7,248,880 B2* | 7/2007 | Gheorghiu et al. | 455/456.1 |
| 7,294,956 B2* | 11/2007 | Maeda et al. | 313/486 |
| 8,073,565 B2* | 12/2011 | Johnson | 700/245 |
| 8,081,957 B2* | 12/2011 | O'Neil | 455/414.1 |
| 2001/0018349 A1* | 8/2001 | Kinnunen et al. | 455/456 |
| 2003/0050077 A1* | 3/2003 | Takeuchi et al. | 455/456 |
| 2003/0050079 A1* | 3/2003 | Tsunehara et al. | 455/456 |
| 2003/0114168 A1* | 6/2003 | Shi et al. | 455/456 |
| 2003/0134645 A1* | 7/2003 | Stern et al. | 455/456 |
| 2003/0161379 A1* | 8/2003 | Wolak et al. | 372/108 |
| 2004/0009750 A1* | 1/2004 | Beros et al. | 455/41.2 |
| 2004/0192332 A1 | 9/2004 | Samn | |
| 2004/0203864 A1* | 10/2004 | DiBuduo | 455/456.1 |
| 2004/0239498 A1* | 12/2004 | Miller | 340/539.13 |
| 2004/0257273 A1* | 12/2004 | Benco et al. | 342/357.1 |
| 2005/0037775 A1* | 2/2005 | Moeglein et al. | 455/456.1 |
| 2005/0148342 A1* | 7/2005 | Sylvain | 455/456.3 |

(Continued)

FOREIGN PATENT DOCUMENTS

| | | |
|---|---|---|
| EP | 0 618 745 A1 | 10/1994 |
| EP | 0 944 277 A2 | 9/1999 |

(Continued)

*Primary Examiner* — Ernest Unelus

(57) ABSTRACT

A method and an arrangement for configuration of a mobile appliance in a communication arrangement, with a communication address that is linked to its location in each case being assigned to the mobile appliance are provided. For this purpose, the location of the mobile appliance is determined in a first step, a configuration which is linked to the determined location is checked in a second step from a database, and this determined configuration is assigned to the mobile appliance in a third step.

19 Claims, 1 Drawing Sheet

U.S. PATENT DOCUMENTS

| | | | |
|---|---|---|---|
| 2005/0250491 A1* | 11/2005 | Roy ............................... | 455/428 |
| 2005/0288033 A1* | 12/2005 | McNew et al. ............ | 455/456.1 |
| 2006/0034211 A1* | 2/2006 | Kojima ......................... | 370/328 |
| 2006/0109811 A1* | 5/2006 | Schotten et al. .............. | 370/328 |
| 2006/0258371 A1* | 11/2006 | Krishnamurthi et al. .. | 455/456.1 |
| 2007/0036118 A1* | 2/2007 | Shaffer et al. ................. | 370/338 |
| 2007/0067823 A1* | 3/2007 | Shim et al. ........................ | 726/2 |

FOREIGN PATENT DOCUMENTS

| | | |
|---|---|---|
| EP | 1 515 485 A2 | 3/2005 |
| EP | 1 528 820 A1 | 5/2005 |
| GB | 2 360 914 A | 10/2001 |
| WO | WO 02/096041 A1 | 11/2002 |

* cited by examiner

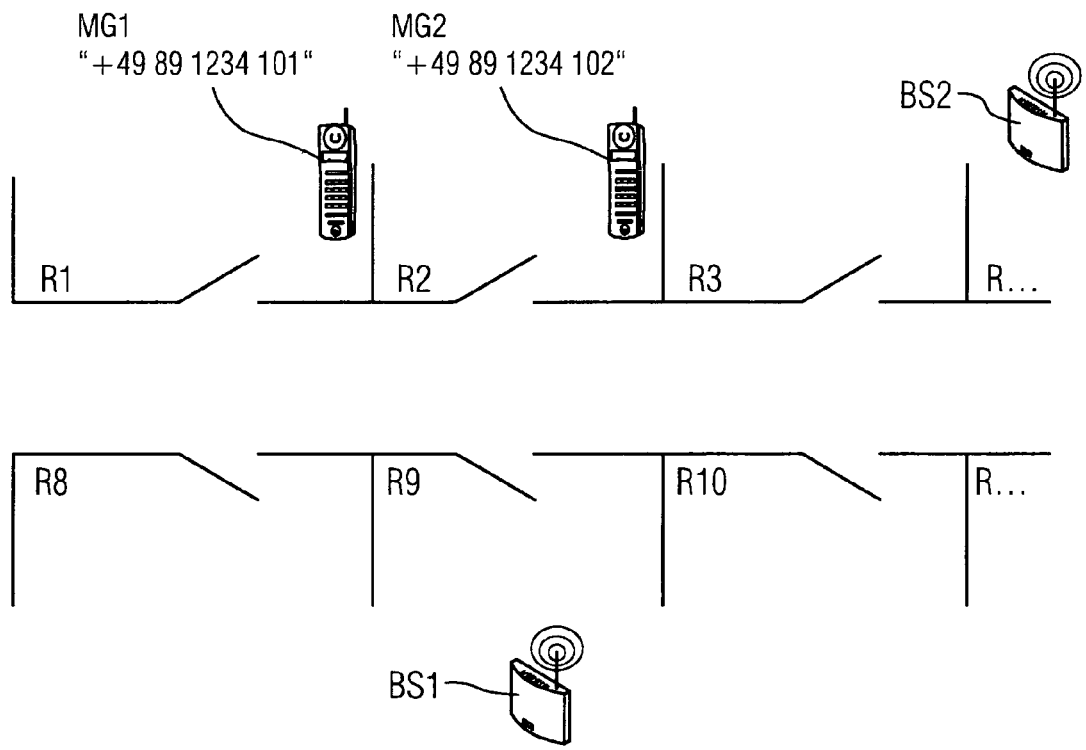

METHOD AND ARRANGEMENT FOR POSITION-DEPENDENT CONFIGURATION OF A MOBILE APPLIANCE

CROSS REFERENCE TO RELATED APPLICATIONS

This application is the US National Stage of International Application No. PCT/EP2006/065800, filed Aug. 30, 2006 and claims the benefit thereof. The International Application claims the benefits of German application No. 10 2005 045 182.9 DE filed Sep. 21, 2005, both of the applications are incorporated by reference herein in their entirety.

FIELD OF INVENTION

The invention relates to a method for configuring a mobile appliance and to an arrangement for performing a method for configuring a mobile appliance.

BACKGROUND OF INVENTION

Appliances used in communication networks (voice networks, data networks, etc.) are provided with communication addresses which are used to use the appliances (communication appliances). Thus, telephones or telephone-like appliances are allocated telephone numbers, computers and computer-like appliances (laptop computers, PDAs, WLAN clients, etc.) use IP addresses (IP=Internet Protocol), computer printers and similar peripherals are likewise addressed using IP addresses or using network names, etc. Either the appliances have already been allocated such addressed by the manufacturer or else they are allocated to the appliances manually, also referred to as administering them. Finally, it is often customary in the case of components (appliances) in computer networks, for example, to assign communication addresses to an appliance automatically, for example using the DHCP method (DHCP=Dynamic Host Configuration Protocol).

In the case of yet other appliances, for example in the case of the telephones, it is frequently so that the appliance itself is not allocated a communication address (in this case a telephone number) but rather the physical connection which is used to connect these appliances to a communication system.

It is frequently desirable to assign a quite particular communication address to an appliance from a stock of communication addresses on the basis of location. Thus, in hotel rooms, for example, the communication appliances (telephones) installed in them or the corresponding interfaces of the communication system have telephone numbers used for them which are either identical to the room number or else at least partially comprise portions of the room number. Thus, by way of example, a telephone in room R315 (third floor, room 15) has the internal telephone number 315 or 9315 or the like. Another example of a location-based communication address of this kind is a computer printer (network printer) which is operated in a conference room and can be addressed via a computer network as "Conference Room 1 Printer". Such "plain text addresses" are usually able to be converted into an IP address or another "technical" communication address within the computer network, for example by what is known as a "DNS server" (DNS=Domain Naming Service).

SUMMARY OF INVENTION

When existing appliances which have a "location-dependent" communication address are replaced by new appliances—for example the aforementioned network printer—the new appliance needs to be allocated the communication address and other location-related configuration data from the replaced appliance manually. Whereas, when a corded telephone (which is therefore also a mobile appliance within the context of this patent application) is replaced, for example in the aforementioned hotel room, the previous communication address (telephone number) is retained because the new telephone is being operated on the previous connection (interface), setting up a cordless, mobile appliance (for example a DECT telephone) again, or replacing it, requires the desired room-based or location-linked communication address to be assigned manually to the new or replaced appliance.

Similar administration operations also arise for other address-based appliances, for example for barcode readers used in the receiving area in a large factory. This involves each receiving area (gate, platform or the like) having an associated barcode reader, with every delivered good being scanned and hence a merchandise management system being notified of which receiving area has received what goods at what time. When such a scanner (barcode reader), which is usually connected to the data network, is replaced, this new scanner either needs to be assigned the appropriate location-based communication address, although this is not usual in the case of the IP addresses usually used, or else the existing communication address/IP address of the scanner needs to be linked to the new location of the appliance. Both have an associated high level of manual involvement.

It is thus an object of the present invention to simplify the configuration of mobile appliances in communication arrangements.

The object is achieved by a method and by an arrangement in accordance with the independent claims.

The object is achieved by proposing a method for configuring a mobile appliance in a communication arrangement, where the mobile appliance is assigned a respective communication address linked to its location. In this case, a first step involves the location of the mobile appliance being ascertained, a second step involves a configuration (configuration data record) linked to the ascertained location being requested from a database, and a third step involves this ascertained configuration being assigned to the mobile appliance. Such a method allows a location-based configuration to be allocated to a mobile appliance or location-based configuration data to be applied to a mobile appliance quickly and easily.

The object is also achieved by an arrangement for performing the aforementioned method, having a detection device for detecting the location of the mobile appliance, having a database for storing a plurality of configurations, linked to a respective location, for mobile appliances, and having an assignment device for retrieving one of the location-based configurations from the database and for assigning this retrieved configuration to the mobile appliance. In this context, little or no user intervention at all is used to provide a mobile appliance with a configuration (e.g. communication address) based on its current location, so that a configuration linked to the location can also continue to be used where the mobile appliance is reinstalled or replaced.

Advantageous refinements of the inventive method are specified in the dependent patent claims. The features and advantages descried in this context also apply, mutatis mutandis, to the inventive arrangement, and vice versa.

Unintentional reconfiguration, for example when the location of the mobile appliance is changed briefly, is prevented by virtue of the configuration being assigned only after an assignment command from a user has been input. Alternatively or in addition, a minimum time is also foreseeable which needs to elapse after a change of location before a changed configuration is assigned.

Advantageously, the database distinguishes appliances according to types, so that a plurality of configurations, for example one for each type or for each functionality, can be provided for each location, the type or the functionality of the appliance to be configured being used to use one of these configurations.

Arrangements with frequently changing use locations for the mobile appliances can be updated in real time by virtue of the first method step being performed repeatedly and every ascertainment of the location of the mobile appliance being followed by a check being performed to determine whether the configuration currently assigned to the mobile appliance is linked to the most recently ascertained location, where in the event of there being no match the user is provided with the option of command input for the assignment command by means of a user interface.

The method dispenses with a particularly large amount of manual involvement if the mobile appliance used is a wireless communication appliance, because such appliances are known to be frequently used at variable locations.

The method is particularly suitable for dispensing with administration involvement in voice communication arrangements, for example private branch exchanges, by virtue of the assignment of the configuration involving assignment of a communication address, for example a direct dial telephone number. A particularly frequent instance of application is covered in this case when the communication appliance is used in a building with a plurality of rooms, where a plurality of the rooms have a respective associated room number and the communication address associated with the respective location of the communication appliance is at least partially identical to a portion of the respective room number of the location. The same advantage arises when wired communication appliances are involved which are installed on a renewed basis or afresh and hence are also mobile appliances.

If the mobile appliance used is a (in particular wirelessly linked) computer peripheral, for example a W-LAN or WiFi/WiMax appliance, the method can be used to simplify the addressing in a (wireless) data network. The same applies for wired network components which are subjected to a change of location. A particularly advantageous use arises when the computer peripheral used is a printer and/or a scanner and/or a fax machine, the location-based configuration to be assigned being in a form such that the mobile and/or nonmobile further appliances associated with the same location have access to this computer peripheral. Such appliances can be used advantageously in conference rooms, for example, so that persons present use their computers to use respective peripherals in their vicinity without complex address inputs using a descriptor associated with the appliance or its communication address, for example a comment, a URL (Uniform Resource Locator) or a path statement.

In the second step, not only the communication address but also other configuration data linked to the current location of the mobile appliance can be transmitted to and used on the mobile appliance, said data being used to activate and/or deactivate functions of the mobile appliance. This allows appliances to be matched to the respective location in terms of their functionality, for example in respect of their user interface.

Particularly precise location finding is possible if the device for ascertaining the location is part of the mobile appliance. For this, satellite-assisted position receivers such as GPS receivers are advantageously suitable. Alternatively, it is also possible to use network-assisted position finding systems, for example the field strength values (radio test data) detected by a plurality of radio base stations anyway can be used for triangulation for the transmissions received from a mobile wireless appliance. It is then not necessary to use any additional hardware for position finding. Evaluation of signal propagation times for a radio transmission to a plurality of radio base stations can also be used for position finding.

BRIEF DESCRIPTION OF THE DRAWINGS

Exemplary embodiments of the inventive method are explained below with reference to the drawing. These are simultaneously used to explain an exemplary embodiment for an arrangement based on the invention.

In this context, the single FIGURE shows an arrangement comprising two mobile appliances and two radio base stations in an environment having a plurality of rooms.

DETAILED DESCRIPTION OF INVENTION

The FIGURE shows two DECT telephones as mobile appliances MG1, MG2, coverage being provided for the two DECT telephones by two radio base stations BS1, BS2. The radio base stations BS1, BS2 in this arrangement are part of a private communication network which, incidentally, is not shown in the FIGURE. The arrangement shows an example of part of a building, for example a floor in a hotel with the rooms R1 to R10. In addition to the descriptors for the mobile appliances MG1, MG2, the FIGURE also shows the telephone numbers "+49 89 123 101", "+49 89 123 102" to be allocated, the last 3 digits respectively indicating the direct dial numbers in a private branch exchange.

It goes without saying that instead of the DECT communication network shown here it is also possible to consider another—for example a line-connected—communication network. Instead of the voice communication terminals (DECT telephones) shown here, it is also possible to consider computers or computer-like appliances, for example WLAN terminals and the associated access points.

In the arrangement shown, the aim is for each mobile appliance MG1, MG2 to be able to be reached on a telephone number which is associated with the respective room number for the rooms R1 . . . R10 which respectively contain the mobile appliance MG1, MG2. In the hotel considered by way of example, this means that it is expected that the mobile appliance MG1 in room R1 with the descriptor "R1" is assigned the direct dial number 101 (telephone number "+49 89 123 101"), while the mobile appliance MG2 in room R2 with the number "R2" can be reached on "+49 89 123 102", and a possible appliance in room R10 can be reached on the telephone number "+49 89 123 110". Hence, a significant portion of the location descriptor (room number) is preferably also a significant part of the communication address (telephone number or direct dial number).

This is achieved by using an assignment device for this purpose in the communication installation (not shown) to which the radio base stations BS1, BS2 are connected. The assignment device determines the location of the mobile appliances MG1, MG2 used at regular intervals of time, for example once daily.

Instead of this "time control", it is also possible to use what is known as an "event-controlled" method. This may involve the use of an incentive to start the operation. Thus, by way of example, wirelessly linked mobile appliances are also frequently connected to a mains-connected power supply (power supply unit). A change of location is usually also associated with an interruption to the power supply, which means that the appliance is restarted. This restart is then a reason for fresh position finding and hence for reassignment of configuration data.

In this case, the location finding is effected by testing the reception field strength at which a respective radio signal transmitted by the mobile appliances MG1, MG2 can be received on the radio base stations BS1, BS2 (and other radio base stations); the mobile appliances MG1, MG2 are prompted to transmit an appropriate radio signal by means of a test data transmission. The relationship of the respective measured values (radio test data) can be used to determine the location of the mobile appliances MG1, MG2. Such a method—and also other, more precise methods—for locating mobile appliances MG1, MG2 are sufficiently well known from the literature and are not explained further at this juncture.

When the locations, that is to say first of all the coordinates, of the mobile appliances MG1, MG2 have been detected, the assignment device accesses a database (likewise not shown) which stores, for each of the rooms R1, R10, area of geographical coordinates which describe the surface area of the respective rooms R1 . . . R10. In addition, the database has respective communication addresses associated with the respective rooms R1 . . . R10 as configuration data, the telephone service having a respective first telephone number (for example with the direct dial numbers 101, 102, . . . , 110) stored for it and the fax service having other telephone numbers (for example direct dial numbers 901, . . . , 910) stored for it. The assignment device now retrieves the configuration data provided for the rooms R1, R2 and hence the telephone numbers for the DECT telephones, in this case the telephone numbers "+49 89 123 101", "+49 89 123 102" (that is to say the direct dial numbers 101, 102), and compares these telephone numbers with the telephone numbers which are currently assigned to the mobile appliances MG1, MG2. Whereas, in this exemplary embodiment, the mobile appliance MG1 already has the telephone number "+49 89 123 101" correctly associated with it, the telephone number currently associated with the mobile appliance MG2 (e.g. direct dial number 104) differs from the required telephone number "+49 89 123 102".

In an optionally selectable step, the assignment device now prompts an appropriate output on the user interface (display) of the mobile appliance MG2 telling the user that a change of telephone number for the direct dial numbers is intended from 104 to the direct dial number 102. The user now has the option of agreeing to this change, or else not. Normally, the user will reject the change in a communication address (telephone number) in cases in which he is only briefly in the "foreign" room R2. Otherwise, the mobile appliance MG2 is now allocated the telephone number "+49 89 123 102". In the exemplary embodiment shown here, the telephone number allocation is made in a database in the communication system (not shown); in mobile appliances which are part of another technology, this change in the communication address can and must naturally be made in the relevant mobile appliance MG2 itself.

It goes without saying that the operation of position finding (location ascertainment) and the subsequent assignment of a location-dependent configuration and hence a communication address are also initiated by a simple manual operator control step. Thus, by way of example, when a faulty mobile appliance MG1 in the room R1 is replaced by another mobile appliance MG2, not currently being used elsewhere, from another room, this mobile appliance MG2 can be instructed, by calling up an appropriate function on its user interface, to make contact with an assignment device and hence to obtain a new configuration assignment, in this case: a communication address, for example the telephone number "+49 89 123 101" in this case. In this context, the current location or the location to be applied may alternatively also be input manually; in the latter case, the mobile appliance does not need to be brought to its intended location for configuration.

Another exemplary embodiment is a computer peripheral, for example a network printer, which is operated using a wireless interface (e.g. WLAN adapter) in a radio data network. When such a computer peripheral is introduced into a particular room, for example into a company's conference room, the new location of the network printer can be registered by an assignment device, for example by triangulation using the radio test data from a plurality of access points. This means that the descriptor of the network printer can be reconfigured to the name "conference_room_color_printer", for example, in a list of available network printers which is available throughout the network. When using their mobile computers (laptops), users of the conference room are then able to display the list of available network printers when needed and to use the "conference_room_color_printer" entry therein to select and use the printer which is in proximity to them. In this case, the descriptor "conference_room_color_printer" sets up the reference to a communication address (e.g. IP address, URL or path statement) for the printer. It is possible to see that in this case the configuration associated with the printer is not inevitably applied in the relevant appliance itself, but rather in another network component, for example in what is known as a printer server (spooler or the like).

The data required for a basic configuration (e.g. a communication address) can also be used to retrieve other location-dependent information from the database. By way of example, the database may contain a note that no outside calls may be made in the room R1, for example to prevent misuse. In this case, the additional configuration data influence the user interface of the mobile appliance MG1 such that the possibility of inputting an external telephone number is removed. Similarly, the aforementioned network printer, for example, may be controlled such that when it is used in a "public" conference room the use of (possibly expensive) special paper or the printing of high-resolution holographics or other costly and time-consuming documents is blocked.

Another exemplary embodiment is what is known as a barcode reader ("scanner"), which is used to record the receipt of goods in a company. With every logged goods receipt, the merchandise management system stores a location for the scanner. A location statement, which is based on location at all times and which is allocated in similar fashion to the examples described above, allows the geographical location of the goods receipt and hence, by way of example, an area responsible for the operation in a larger warehouse to be tracked.

The invention claimed is:

1. A method for configuring a mobile appliance in a communication system, the system comprised of the mobile appliance and an assignment device, the method comprising:
the assignment device determining a location of the mobile appliance;
the assignment device requesting a configuration for the mobile appliance from a database, the configuration being linked to the determined location;
the assignment device assigning the configuration to the mobile appliance such that the mobile appliance is assigned a communication address linked to the location of the mobile appliance, the assigned communication address being an address of the mobile and wherein the configuration linked to the location of the mobile appliance that is assigned is in a form such that another mobile appliance associated with the location of the mobile appliance has access to the mobile appliance using a descriptor allocated by the assignment device; and wherein the assignment device requesting the configuration comprises a request that the configuration also be based on a type and a functionality of the mobile appliance.

2. The method as claimed in claim 1, wherein the assigning occurs after an assignment command from a user has been provided as input to the assignment device.

3. The method as claimed in claim 2, further comprising:
the assignment device repeating the determining of the location and the requesting the configuration;
the assignment device checking the configuration of the mobile appliance with the repeated configuration request; and
the assignment device providing the user an option to reconfigure the mobile appliance with the repeated configuration request when the configuration does not match the repeated configuration request, the option provided via a user interface of the mobile appliance.

4. The method as claimed in claim 3, wherein the repeating is done periodically after a predetermined period of time.

5. The method as claimed in claim 3, wherein the repeating is done after the mobile appliance is restarted.

6. The method as claimed in claim 1, wherein the mobile appliance is a wireless communication appliance or a telephone.

7. The method as claimed in claim 1, wherein the mobile appliance is used to communicate with the assignment device to initiate the mobile appliance configuration.

8. The method as claimed in claim 7, wherein the mobile appliance is a communication appliance, the communication appliance being used in a building having a plurality of rooms, wherein each of the rooms has a respective room number, and wherein the communication address associated with the respective location of the communication appliance comprises at least a portion of the respective room number of the location.

9. The method as claimed in claim 1, wherein the mobile appliance is a communication appliance, the communication appliance is used in a building having a plurality of rooms, wherein each of the rooms has a room number, and wherein the communication address associated with the respective location of the communication appliance comprises at least a portion of the respective room number of the location.

10. The method as claimed in claim 1, wherein the mobile appliance is a computer peripheral.

11. The method as claimed in claim 10, wherein the computer peripheral is selected from the group consisting of a printer, a scanner, a fax machine and combinations thereof.

12. The method as claimed in claim 10, wherein the computer peripheral is at least one computer peripheral selected from the group consisting of a printer, a scanner, a fax machine and combinations thereof, and wherein the assigned configuration is in a form such that a nonmobile appliance associated with the location of the computer peripheral has access to the computer peripheral using a descriptor allocated by the assignment device.

13. The method as claimed in claim 1, wherein the configuration activates, deactivates or both activates and deactivates at least one function of the mobile appliance.

14. The method as claimed in claim 7, wherein the database distinguishes mobile appliances according to the type and the functionality, wherein for at least one location the database includes a plurality of communication addresses differentiated according to the type and the functionality.

15. A communication system for configuring a mobile appliance, comprising:
a detection device configured to detect a location of the mobile appliance;
a database having a plurality of configurations for mobile appliances, each configuration comprised of a communication address linked to a respective location, each communication address being a communication address of a mobile appliance to which that address is assigned;
an assignment device configured to receive data from the detection device that identifies the location of the mobile appliance from the detection device and to retrieve at least one of the configurations linked to the location of the mobile appliance from the database and to assign the retrieved at least one configuration to the mobile appliance; and
wherein the retrieved at least one configuration assigned to the mobile appliance is in a form such that another mobile appliance associated with the location of the mobile appliance has access to the mobile appliance using a descriptor allocated by the assignment device; and
wherein the assignment device retrieving the at least one configuration comprises sending a request that the configuration to be retrieved also be based on a type and a functionality of the mobile appliance.

16. The communication system as claimed in claim 15 wherein the detection device is included in the assignment device or the mobile appliance.

17. The communication system as claimed in claim 15 further comprising:
a plurality of radio base stations, each radio base station providing radio test data to the detection device for detecting the location of the mobile appliance, wherein the detection device accesses at least one of the plurality of radio base stations to detect the location of the mobile appliance.

18. The communication system of claim 15 wherein the mobile appliance is a communication appliance, the communication appliance is configured to be used in a building having a plurality of rooms, wherein each of the rooms has a room number, and wherein the communication address associated with the location of the communication appliance comprises at least a portion of the room number of the location.

19. The communication system of claim 15 wherein the assignment device is configured to assign the retrieved at least one configuration to the mobile appliance after an assignment command from a user has been provided as input to the assignment device.

* * * * *